United States Patent
Park et al.

(10) Patent No.: US 6,297,190 B1
(45) Date of Patent: Oct. 2, 2001

(54) ZNS PHOTOCATALYST, PREPARATION THEREFOR AND METHOD FOR PRODUCING HYDROGEN BY USE OF THE SAME

(75) Inventors: Dae-Chul Park; Jin-Ook Baeg, both of Daejon (KR)

(73) Assignees: Korea Research Institute of Chemical Technology, Daejon; Chunggu Co., Ltd., Daegu, both of (KR)

( * ) Notice: Subject to any disclaimer, the term of this patent is extended or adjusted under 35 U.S.C. 154(b) by 0 days.

(21) Appl. No.: 09/511,324

(22) Filed: Feb. 23, 2000

(51) Int. Cl.$^7$ ............... B01J 23/40; B01D 5/00
(52) U.S. Cl. ............. 502/327; 502/326; 204/157.52
(58) Field of Search ............. 204/157.52; 526/915; 502/80, 439, 326, 327; 423/648.1

(56) References Cited

U.S. PATENT DOCUMENTS 4,484,992 * 11/1984 Buhler et al. ............. 204/157.52
6,077,497 * 6/2000 Park et al. ............. 204/157.52

* cited by examiner

Primary Examiner—Kathryn Gorgos
Assistant Examiner—Thao Tran

(74) Attorney, Agent, or Firm—Jacobson Holman, PLLC

(57) ABSTRACT

The present invention relates to a novel photocatalyst, to preparing the photocatalyst and to a method for producing hydrogen in the presence of the photocatalyst. The novel photocatalyst of this present invention is characterized by the following formula IV:

$$Pt(x)/Zn[M(y)]S \qquad IV$$

wherein "x" represents a percentage by weight of Pt in the photocatalyst ranging from 0.05 to 2.50; "M" is a promoter selected from the group consisting of V, Cr, Mo, Mn, Re, Ru, Os, Rh, Ir, Cu, Al and Ga; and "y" represents a mole % of M/(M+Zn) ranging from 0.01 to 20.00. The method for preparing the photocatalyst comprises the steps of dissolving Zn-containing and M-containing compounds in water in such a way that M/(M+Zn) ranges, in mole %, from 0.01 to 20.00; adding $H_2S$ or $Na_2S$ as a reactant in the solution with stirring to precipitate Zn[M]S; washing the precipitate with water until pH reaches 7 and vacuum-drying the precipitate in a nitrogen(stream) atmosphere; adding Pt-containing compound to this precipitate in such a way that Pt ranges, in percentage by weight, from 0.05 to 2.50; illuminating the platinum-enhanced precipitate with ultraviolet light in a nitrogen atmosphere; washing the Pt-impregnated Zn[M]S thus obtained with water until the wash water pH reaches 7; vacuum-drying and then oxidation sintering the dried precipitate at from 280 to 420° C. for 1 to 3 hours, reduction sintering at the previously-sintered product at from 280 to 420° C for from 1 to 3 hours.

12 Claims, No Drawings

ZNS PHOTOCATALYST, PREPARATION THEREFOR AND METHOD FOR PRODUCING HYDROGEN BY USE OF THE SAME

TECHNICAL FIELD

The present invention relates, in general, to a novel photocatalyst and more particularly, to a photoreaction in which hydrogen is efficiently and economically produced from water in the presence of the photocatalyst. The present invention is also concerned with a method for preparing the photocatalyst and a method for producing hydrogen.

BACKGROUND ART

Hydrogen is a very important material in the chemical industry. For example, it is used to produce ammonia and methanol. Also, it is an essential material for hydrogenation in which unsaturated compounds are converted into saturated ones and also for hydrotreating processes, including hydrogen addition, desulfurization, denitrogenation and demetallization. Another example for the use of hydrogen is contact hydrogenation of carbon dioxide in which carbon dioxide, which causes global waning, is reclaimed, immobilized and reused. In addition, hydrogen is viewed as a pollution-free, clear energy source substituting for existing fossil fuels.

Conventional techniques for obtaining hydrogen include extraction from fossil fuels, such as naphtha, modification of natural gas, reaction of vapor with iron at a high temperature, reaction of water with alkaline metal, electrolysis of water, etc.

However, these techniques are economically unfavorable because immense heat or electric energy is required. Regarding modification of fossil fuels, the conventional techniques have another disadvantage of generating a large quantity of by-products, such as carbon dioxide. In case of electrolysis, problems, such as electrode lifetime and generation of by-products, need to be solved to purify hydrogen more easily. Thus, the cost of facilities for hydrogen production is economically unfavorable due to the noted problems.

Hydrogen gas readily escapes from the earth's gravity because it is of low specific gravity. Most of X exists in water or in inorganic forms. For these reasons, only a small quantity of hydrogen exists in the atmosphere. It is also very difficult and economically unfavorable to purify hydrogen existing in inorganic forms. The development of techniques to obtain high purity hydrogen efficiently from water is very important and urgently needed to exploit substitute energy sources.

Recently, hydrogen producing techniques have been developed in which a photocatalyst is used to decompose water into hydrogen and oxygen. However, little has been published in prior art relating to photocatalysts for producing hydrogen. Representative examples are: Japanese Pat. Laid-Open Publication Nos. Sho 62-191045 and Sho 63-107815.

Japanese Pat. Laid-Open Publication No. Sho 62-191045 relates to generating hydrogen from an aqueous $Na_2S$ solution in the presence of a rare-earth element compound by a photolysis reaction The rarer element compound has an advantage of exhibiting optical catalytic activity in the range of visible light.

Japanese Pat. Laid-Open Publication No. Sho 63-107815 concerns a photolysis reaction in which a composite oxide of niobium and alkaline earth metal is used as a photocatalyst to generate hydrogen from a methanol solution in water. This photocatalyst likewise has an advantage of being active in the range of visible light.

However, both of these prior art methods are disadvantageous because the amount of hydrogen generated by them is as little as 10 ml/0.5 g hr.

Korean Pat. Appl'n. No. 95-7721, No. 95-30416, and No. 96-44214 solve the above problems to some degree by suggesting a photocatalyst represented by the following formula I:

$$Cs(a)/K_4Nb_6O_7 \qquad \qquad I$$

This technique has little effect on the environment and generates hydrogen at room temperature. However, the oxygen-containing organic compounds, which act as hydrogen-generating promoters, make it impossible to reuse required reactants.

Korean Pat. Appl'n No.95-30416 suggests a photocatalyst represented by the following formula II

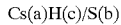
$$Cs(a)H(c)/S(b) \qquad \qquad II$$

This technique has little affect on the environment and generates hydrogen without an oxygen-containing organic compound as a hydrogen-generating promoter at room temperature, but encounters a problem with the lifetime and the stability of the photocatalyst.

For example, when an alkali metal, such as cesium is impregnated into a photocarrier, the amount of generated hydrogen is increased outstandingly but the stability of the catalyst is decreased.

In addition, Korean Pat. Appl'n No. 96544214 suggests a photocatalyst represented by the following formula III

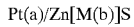
$$Pt(a)/Zn[M(b)]S \qquad \qquad III$$

wherein "a" represents % by weight of Pt in the photocatalyst, ranging from 0.1 to 3.5; "M" represents a promoter selected from a group consisting of Co, Fe, Ni and P; and "b" represents mole % of M.

Similarly, this technique also has little affect on the environment. This compound shows not only the optical activity of photocatalyst in some degree but also the preparation is relatively simple and the stability of photocatalyst is superior. The lifetime of said compound is longer which depends on electron donors and reducing agents and the amount of generated hydrogen is larger than that of prior arts.

When doping with Pt instead of Cs the stability of the catalyst is improved but the choice for a promoter is less, and the amount of generated hydrogen is too little. In addition, there are some problems in the preparation of said photocatalyst. It needs sintering and rewashing twice followed by etching with an acid after primary sintering.

DISCLOSURE OF THE INVENTION

Therefore, it is an object of the present invention to overcome the previously-noted problems encountered in prior art, and to provide a novel photocatalyst for producing hydrogen, which shows optical activity in the range of visible light (adjusted by a light filter) and also efficiently produces a large quantity of hydrogen.

It is another object of the present invention to provide a photocatalyst which has a semi-permanent lifetime.

It is a further object of the present invention to provide a simpler method for a photocatalyst to produce hydrogen.

In accordance with an aspect of the present invention, there is provided a photocatalyst represented by the following formula IV:

$$Pt(x)/Zn[M(y)]S \qquad \qquad IV$$

wherein "x" represents % by weight of Pt, ranging from 0.05 to 2.50; "M" is a metal element selected from the group consisting of V, Cr, Mo, MA, Re, Ru, Os, Rh, Ir, Cu, Al, and Ga; and "y" is mole % of MN(M+Zn) in the range of 0.01 to 20.00.

Another aspect of the present invention is a method for preparing a photocatalyst comprising the steps of: dissolving a Zn-containing and an M-containing compound in water in such a way that the mol percent of M ranges from 0.01 to 20; adding sufficient $H_2S$ and/or $Na_2S$ as a reactant to the solution (with stirring) to precipitate Zn[M]S; washing the resulting precipitate with water until the pH of the wash water reaches 7 and then drying the precipitate; adding a liquid Pt-containing compound to this resulting precipitate to obtain a precipitate with from 0.05 to 2.50% by weight Pt; doping the Pt to Zn[M]S, e.g., by irradiation with UV light in a nitrogen atmosphere; washing the Pt-doped precipitate with wash water until the pH of the wash water reaches 7, and drying it; oxidation sintering in air at from 280 to 420° C. for from 1 to 3 hours; and reduction sintering (e.g., in a 95/5 nitrogen/hydrogen atmosphere) at from 280 to 420° C. for 1 to 3 hours.

In accordance with a farther aspect of the present invention, hydrogen is produced by a method in which UV or visible light (adjusted by a light filter) is irradiated onto a suspension of the photocatalyst in water to which $Na_2S$ (as an electron donor) and $NaH_2PO_2$ (as a reduction agent) have been added.

BEST MODE FOR CARRYING OUT THE INVENTION

As a result of research to solve the previously-noted problems, it was found that each of V, Cr, Mo, Mn, Re, Ru, Os, Rh, Ir, Cu, Al, and Ga, as well as Fe, Co, Ni, and P (Korean Pat. Appl'n No. 95-30416), can be an effective M ingredient as a promoter in the photocatalyst of the present invention.

It was found that Pt, as an electron acceptor, works well in the range of from 0.05 to 2.50% by weight. Below 0.05% by weight, the amount of generated hydrogen is decreased, and the stability of the photocatalyst is also decreased. On the other hand, over 2.50% by weight, the amount of generated hydrogen is decreased, and the cost of hydrogen production is increased.

The proper content of M in said photocatalyst is from 0.01 to 20.00 mole %. In case of less than 0.01 mole % of M, the function of photocatalyst is lost, and in case of over 20.00 mole % of M, the amount of generated hydrogen is decreased.

The appropriate molar ratio of Zn/S is from 1:0.1 to 1:2.8, and more desirably from 1:0.6 to 1:1.4. Within said molar ratio, the effectiveness of the photocatalyst is improved.

The reason why sintering at oxidation and reduction states and drying after pH reaches 7 is to keep Pt, an electron acceptor, of said photocatalyst in pure state. As reportedly, Pt of $H_2PtCl_6$ is bonded to S of ZnS to form PtS by irradiating UV for the reaction and is transferred to the Wurzite structure at a temperature over 300° C. at oxidation and reduction states for hours and, at the same time, Pt, an electron acceptor, is transferred to Pt(0) by sintering at over 300° C. for from 1 to 2 hours.

Examples of Zn-containing compounds are $ZnSO_4.7H_2O$ and $Zn(NO_3)_2.6H_2O$; other examples of M-containing compounds are $VCl_3$, $VOSO_4$, $VOCl_3$, $K_2Cr_2O_7$, $Cr(NO_3)_3$, $MnF_3$, $ReCl_3$, $MoCl_5$, $FeCl_3$, $Fe(NO_3)_3$, $RuCl_3$, $Co(NO_3)_2$, $CoCl_2$, $Co(CH_3COO)_2$, $RhCl_3$, $Co(NO_3)_2$, $CoCl_2$, $Co(CH_3COO)_2$, $RhCl_3$, $Rh(NO_3)_3$, $IrCl_3$, $Ni(NO_3)_2$, $NiCl_2$, $Pd(NO_3)_2$, $CuCl_2$, $Cu(NO_3)_2$, $CuSO_4$, $Al(NO_3)_3$, $AlCl_3$, $Ga(NO_3)_2$, and $H_3PO_2$.

Korean Pat. Appl'n No. 9644214 presents a procedure comprising washing acid after etching with an acid, followed by primary sintering, but in this present invention, only vacuuming in a nitrogen atmosphere is only needed without primary sintering, etching with an acid and washing the acid.

It is preferable to impregnate Zn[M]S with Pt, comprising the steps of: dissolving hydrogen hexachloroplatinate ($H_2PtCl_6$) in water, adding the resulting solution to the Zn[M]S, and then illuminating the obtained product with UV light; washing the Pt-impregnated Zn[M]S until the pH of the wash water reaches 7, and subjecting the Pt-impregnated precipitate to vacuum-drying in a nitrogen atmosphere and at from 100 to 120° C. for from 1.5 to 2.5 hours before oxidation sintering at a temperature from 280 to 420° C. for from 1 to 3 hours, and reduction sintering at a temperature from 280 to 420° C. for from 1 to 3 hours.

Actually, the sintering is preferably performed at a temperature from 320 to 400° C., beyond this temperature range the lifetime and activity of the obtained photocatalyst are decreased.

According to the present invention hydrogen is produced by dissolving from 0.15 to 0.40 mols per liter of $Na_2S$ (as an electron donor) and from 0.20 to 0.5 mols per liter of $NaH_2PO_2$ (as a reducing agent) in primary and/or secondary distilled water or in the previously treated water, and adding the photocatalyst of the present invention thereto. Then, the thus-obtained suspension is irradiated with UV or visible light (adjusted by a light filter) with string at a temperature of from 5 to 85° C. under from 0.1 up to 5 atm. to produce hydrogen in a high yield.

When the concentration of the electron donor and of the reducing agent is less than the indicated lower limit, the amount of generated hydrogen is decreased. On the other hand, when the concentration of the electron donor and of the reducing agent is over the upper limit, the amount of generated hydrogen does not increase. The appropriate reaction conditions are at a temperature of from 10 to 60° C. from in vacuo to under 2 atmospheres.

Preparation Example I

To 250 ml of water add a 1 molar amount of $ZnSO_4.7H_2O$, a 0.005 molar amount of $Al(NO_3)_2.9H_2O$, and sufficient $H_2S$ (with stirring) to obtain a precipitate of Zn[Al]S. Wash the precipitate with wash water until the resulting wash water has a pH of 7. Then vacuum dry the thus-washed precipitate at a temperature of 110° C. in a nitrogen atmosphere for 2 hours.

Add hydrogen hexachloroplatinate ($H_2PtCl_6$) to the dried precipitate Zn[Al]S to impart 0.8 weight % of Pt to the precipitate. Illuminate the platinum-enhanced precipitate with UV light (450 W high pressure mercury lamp with light source 4 cm from sample) for 0.5 hour to obtain Pt/Zn[Al]S. Wash the Pt/Zn[Al]S with wash water until the pH of the wash water is 7. Then dry the washed Pt/Zn[Al]S precipitate in a nitrogen atmosphere at 110° C. for 2 hours. Subject the thus-washed and dried precipitate to oxidation sintering in air at 370° C. for 1.5 hours to obtain a final Pt(0.8 wt. %)/Zn[Al]S photocatalyst.

Preparation Example II

Repeat Preparation Example I with 0.01 molar (instead of 0.005 molar) Al(NO$_3$)$_2$.9H$_2$O to obtain a final Pt(0.8 wt. %)/Zn[Al]S photocatalyst.

Preparation Example III

Repeat Preparation Example I with 0.05 molar (instead of 0.005 molar) Al(NO$_3$)$_2$.9H$_2$O to obtain a final Pt(0.8 wt. %)/Zn[Al]S photo catalyst.

Preparation Example IV

Repeat Preparation Example I with 0.05 molar H$_3$PO$_2$ {instead of Al(NO$_3$)$_2$.9H$_2$O)} to obtain a final Pt(0.8 wt. %)/Zn[P]S photocatalyst.

Preparation Example V

Repeat Preparation Example I with 0.005 molar H$_3$PO$_2$ {instead of Al(NO$_3$)$_2$.9H$_2$O)} to obtain a final Pt(0.8 wt. %)/Zn}P]S photocatalyst.

Preparation Example VI

Repeat Preparation Example IV with sufficient hydrogen hexachloroplatinate to impart 0.4% by weight (instead of 0.8% by weight) of Pt to the precipitate to obtain a final Pt(0.4 wt. %)/Zn[P]S photocatalyst.

Preparation Example VII

Repeat Preparation Example IV with sufficient hydrogen hexachloroplatinate to impart 2.5% by weight (instead of 0.8% by weight) of Pt to the precipitate to obtain a final Pt(2.5 wt. %)/Zn[P]S photocatalyst.

Preparation Examples VIII TO XXIV

Repeat Preparation Example I varying the M-containing compound to obtain each of the Pt(0.8 wt. %)/Zn[M]S photocatalyst compositions of Table I.

EXAMPLES I TO XXIV

Suspend 0.5 g of each photocatalyst, respectively, obtained in Preparation Examples I to XXIV in 500 ml of water which contains 0.24 molar Na$_2$S and 0.35 molar NaH$_2$PO$_2$ (with stirring at a speed of 400 rpm) in a photo reactor of a closed gas circulation system.

Illuminate the resulting aqueous suspension with visible light {500 W Xe lamp with an optical filter (which passes light having a wavelength over 400 nm) with the light source 4 cm from the sample} at room temperature under one atmosphere. The amount of generated hydrogen thus produced (as analyzed by gas chromatography) is set forth in Table I.

EXAMPLE XXV

Following the procedure of Examples I with a photocatalyst obtained from Preparation Example IV, except for using UV (450 W high pressure mercury lamp with light source 4 cm from sample) instead of visible light, results are provided in Table I.

Comparative Example I

Repeat the procedure of Preparation Example XIX, but without the oxidation/reduction sintering steps, to obtain the photocatalyst. Following the method of Examples I to XXIV with that photocatalyst generates the amount of hydrogen indicated in Table I.

Comparative Example II

Following the method disclosed in Korean Pat. Appl'n No. 96-44214 with the same composition as that of Preparation Example X to obtain dried precipitate, treat the precipitate further as follows: primary sintering, etching with nitric acid and secondary sintering to obtain a photocatalyst. Using that photocatalyst in the method of Examples I to XXIV yields the amount of generated hydrogen reflected in Table I.

TABLE I

| Exam. No. | Catalyst | Amount of Gas (ml/hr) |
|---|---|---|
| I | Pt(0.8 wt. %)/Zn[Al(0.5)]S | 1329 |
| II | Pt(0.8 wt. %)/Zn[Al(0.99)]S | 1410 |
| III | Pt(0.8 wt. %)/Zn[Al(4.76)]S | 875 |
| IV | Pt(0.8 wt. %)/Zn[P(4.76)]S | 1529 |
| V | Pt(0.8 wt. %)/Zn[P(0.5)]S | 1293 |
| VI | Pt(0.4 wt. %)/Zn[P(4.76)]S | 1070 |
| VII | Pt(2.5 wt. %)/Zn[(4.76)]S | 966 |
| VIII | Pt(0.8 wt. %)/Zn[P(9.09)]S | 1370 |
| IX | Pt(0.8 wt. %)/Zn[Cu(0.5)]S | 914 |
| X | Pt(0.8 wt. %)/Zn[Cu(0.99)]S | 614 |
| XI | Pt(0.8 wt. %)/Zn[Cr(0.2)]S | 1358 |
| XII | Pt(0.8 wt. %)/Zn[Cr(0.5)]S | 914 |
| XIII | Pt(0.8 wt. %)/Zn[Cr(4.76)]S | 491 |
| XIV | Pt(0.8 wt. %)/Zn[V(0.5)]S | 1085 |
| XV | Pt(0.8 wt. %)/Zn[Mo(0.5)]S | 606 |
| XVI | Pt(0.8 wt. %)/Zn[Mn(0.5)]S | 1251 |
| XVII | Pt(0.8 wt. %)/Zn[Re(0.5)]S | 1044 |
| XVIII | Pt(0.8 wt. %)/Zn[Fe(0.5)]S | 1005 |
| XIX | Pt(0.8 wt. %)/Zn[Ru(0.5)]S | 1149 |
| C.I | Pt(0.8 wt. %)/Zn[Ru(0.5)]S | 314* |
| XX | Pt(0.8 wt. %)/Zn[Co(0.5)]S | 725 |
| XXI | Pt(0.8 wt. %)/Zn[Rh(0.5)]S | 1227 |
| XXII | Pt(0.8 wt. %)/Zn[Ir(0.5)]S | 1058 |
| XXIII | Pt(0.8 wt. %)/Zn[Ni(0.5)]S | 966 |
| XXIV | Pt(0.8 wt. %)/Zn[Ga(0.5)]S | 954 |
| XXV | Pt(0.8 wt. %)/Zn[P(4.76)]S | 3240** |
| C.II | Pt(0.8 wt. %)/Zn[Cu(0.99)]S | 420*** |

*Without oxidation/reduction sintering steps.
**The UV light was used for illumination.
***Etching with an acid after primary sintering.

Industrial Applicability

As apparent from the data in Table I, the photocatalyst for the hydrogen production in accordance with the present invention can be used with various kinds of promoters, and the amount of generated hydrogen with this novel catalyst is greater than that of conventional techniques. Furthermore, the photocatalyst has a longer lifetime and the method of photocatalyst preparation is much simpler than conventional procedures.

The present invention for novel photocatalysts, by introducing various kinds of doping metal elements and various catalyst's applications and its adding techniques, not only overcomes previous restricted activity of photocatalysts to light sources, but also simplifies preparing photocatalysts which are superior in life expectancy as well as hydrogen production yield.

The invention and its advantages are readily understood from the foregoing description. It is apparent that various changes may be made in the processes and compositions without departing from the spirit and scope of the invention or sacrificing its material advantages. The processes and compositions hereinbefore described are merely illustrative of preferred embodiments of the invention.

What is claimed is:

1. A ZnS photocatalyst for producing hydrogen, represented by the following formula IV:

$$Pt(x)/Zn[M(y)]S \qquad \text{IV}$$

wherein
"x" represents a percentage by weight of Pt in the photocatalyst, ranging from 0.05 to 2.50;
"M" represents a promoter and is an element selected from the group consisting of V, Cr, Mo, Fe, Mn, Re, Ru, Co, Os, Rh, Ir, Ni, Cu, Al, P and Ga; and
"y" represents mole % of M(M+Zn) and ranges from 0.01 to 20.00.

2. A ZnS photocatalyst as claimed in claim 1 wherein the molar ratio of Zn/S is from 1:0.1 to 1:2.8.

3. A ZnS photocatalyst as claimed in claim 1 wherein the molar ratio of Zn/S is from 1:0.6 to 1:1.4.

4. A method for preparing a ZnS photocatalyst for the production of hydrogen as claimed in claim 1, comprising the steps of: dissolving a Zn-containing compound and an M-containing compound in water in such a way that M/(M+Zn) ranges, in mole %, from 0.01 to 20; adding a sufficient amount of $H_2S$ or $Na_2S$ (as a reactant) to the solution, with stirring, to precipitate Zn[M]S; washing the obtained precipitate with was water until the pH of the wash water reaches 7; vacuum-drying the washed precipitate in a nitrogen (stream) atmosphere; adding a sufficient amount of a liquid Pt-containing compound to the Zn[M]S to impregnate the Zn[M]S with an amount of about 0.05 to 2.50% by weight of Pt with illuminating UV light in a nitrogen atmosphere; washing the Pt-impregnated Zn[M]S with wash water until the wash water pH reaches 7; and subjecting the washed and impregnated Zn[M]S to vacuum-drying and then to oxidation sintering at from 280 to 420° C. for from 1 to 3 hours; and reduction sintering the thus-sintered product at from 280 to 420° C. for from 1 to 3 hours.

5. A method in accordance with claim 4, wherein said M-containing compound comprises a member selected from the group consisting of $VCl_3$, $VOSO_4$, $VOCl_3$, $K_2Cr_2O_7$, $Cr(NO_3)_3$, $MnF_3$, $ReCl_3$, $MoCl_5$, $FeCl_3$ $Fe(No_3)_3$, $RuCl_3$, $Co(NO_3)_2$, $CoCl_2$, $Co(CH_3COO)_2$, $RhCl_3$, $Rh(NO_3)_3$, $IrCl_3$, $Ni(NO_3)_2$, $NiCl_2$, $Pd(NO_3)_2$, $CuCl_2$, $Cu(NO_3)_2$, $CuSO_4$, $Al(NO_3)_3$, $AlCl_3$, $Ga(NO_3)_2$ and $H_3PO_2$.

6. A method in accordance with claim 4, wherein the vacuum-drying is effected at a temperature of from 100 to 120° C. for from 1 to 3 hours.

7. A method for hydrogen production which comprises irradiating an aqueous suspension of the photocatalyst of claim 1 with UV or visible light, with stirring, and wherein the aqueous suspension comprises from 0.15 to 0.40 mol percent of $Na_2S$ as an electron donor and from 0.2 to 0.5 mol percent of $NaH_2PO_2$ as a reducing agent.

8. A method in accordance with claim 7, which is effected at a temperature of from 10 to 60° C. in vacuo or at a pressure of up to 2 atmospheres.

9. A method in accordance with claim 7, wherein irradiating is effected with UV light.

10. A method in accordance with claim 9, wherein the UV light is that provided by a 450 W high pressure mercury lamp as the light source, which is placed 4 cm from the photocatalyst suspension being irradiated.

11. A method in accordance with claim 9, wherein the visible light is that provided by a 500 W Xe lamp with a light filter which passes light having a wavelength over 400 mm as the light source, which is placed 4 cm from the photocatalyst suspension being irradiated.

12. A ZnS photocatalysts as claimed in claim 1 wherein "M" represents a promoter and is an element selected from the group consisting of V, Cr, Mo, Mn, Re, Ru, Os, Rh, Ir, Cu, Al and Ga.

* * * * *